![](UNITED STATES PATENT OFFICE.)

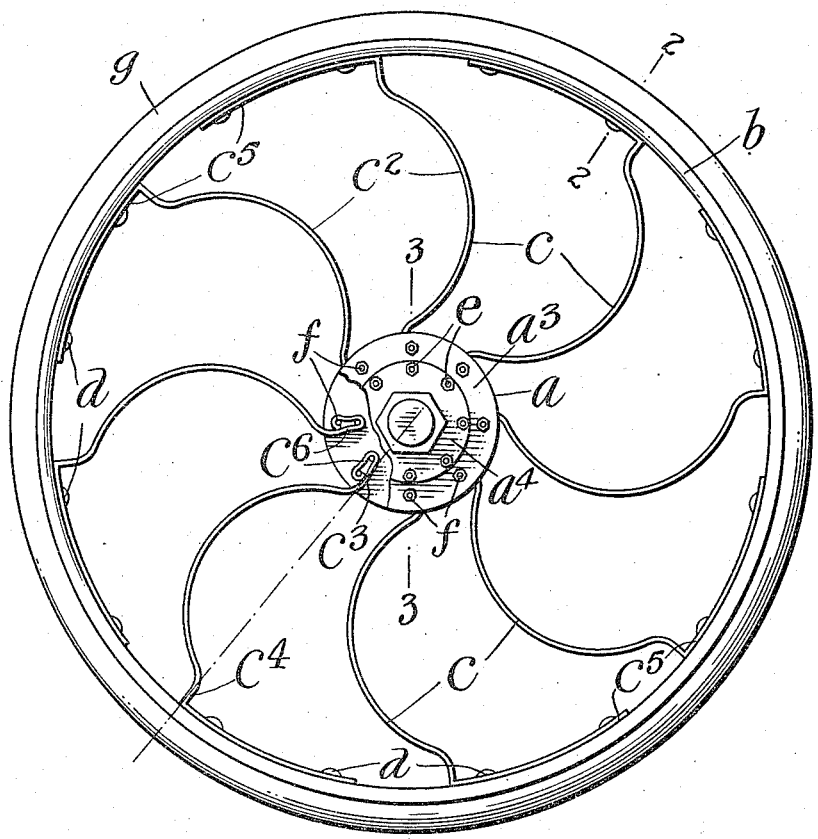
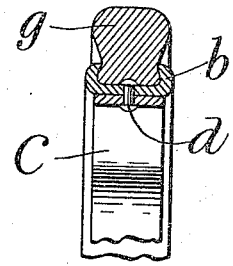
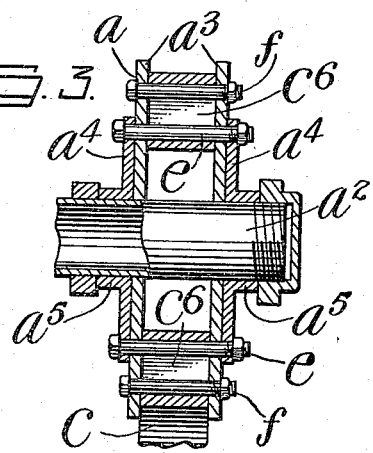

AUGUST GERLEIT, OF NEW YORK, N. Y.

SPRING-WHEEL.

1,160,981.

Specification of Letters Patent.

Patented Nov. 16, 1915.

Application filed July 2, 1914. Serial No. 848,543.

*To all whom it may concern:*

Be it known that I, AUGUST GERLEIT, a citizen of the United States, and residing at New York, in the county of New York and State of New York, have invented certain new and useful Improvements in Spring-Wheels, of which the following is a specification, such as will enable those skilled in the art to which it appertains to make and use the same.

This invention relates to spring or elastic wheels for trucks, power driven and other vehicles, and the object thereof is to provide an improved wheel of this class which will take the place of all wheels having pneumatic tires and which are possessed of the elastic qualities of such wheels, and which will be much stronger and more durable in operation.

The invention described and claimed herein is an improvement on that described and claimed in U. S. Letters Patent granted to me on the 1st day of July, 1913, No. 1,066,267; and is fully disclosed in the following specification, of which the accompanying drawing forms a part, in which the separate parts of my improvement are designated by suitable reference characters in each of the views, and in which:—

Figure 1 is a side view of a wheel made according to this invention, part of the hub construction being broken away; Fig. 2 a partial section on the line 2—2 of Fig. 1; and, Fig. 3 a section on the line 3—3 of Fig. 1.

In the practice of my invention, I provide a wheel comprising a hub $a$, a rim $b$ and spokes $c$. The construction of the preferred form of the hub $a$ is clearly shown in Figs. 1 and 3, and said hub comprises a central sleeve member $a^2$, two main side plates $a^3$ and two supplemental side plates $a^4$ provided in the form of construction shown with collars $a^5$. The spokes $c$ are composed of flat steel springs and comprise central arc-shaped portions $c^2$, inner radial end portions $c^3$ and outer radial end portions $c^4$, and the outer radial end portions $c^4$ are provided with foot members $c^5$ which are bolted to the rim $b$ as shown at $d$. The central arc-shaped portions $c^2$ of the spokes $c$ are all curved in the same direction and the foot members $c^5$ of said spokes all extend in the same direction and the inner radial end portions $c^3$ of said spokes are formed into radially elongated loops $c^6$, and inner and outer bolts $e$ and $f$ engage the ends of said loops and are employed for securing the inner ends of the spokes in the hub, or between the inner plates $a^3$ thereof. The bolts $e$ are passed through the outer part of the plates $a^4$ of the hub and through the plates $a^3$ and through the inner end portions of the loops $c^6$ of the spokes $c$, and the bolts $f$ are passed through the plates $a^3$ near their periphery and through the outer end portions of the loops $c^6$ at the inner ends of the spokes $c$.

In the construction shown, the rim $b$ is provided with a solid tire $g$, but my invention is not limited to any particular form or construction of tire, nor to any particular form or construction of hub, except that the hub must be formed so as to permit of the connection therewith of the spokes $c$ as herein shown and described, and the tire $g$ may also be of any preferred form in cross section, and while I have shown and described the foot members $c^5$ of the spokes $c$ as connected with the rim by bolts $d$, any suitable means for making this connection may be employed.

From the foregoing description, it will be seen that the spokes $c$ have radial portions at each end thereof, and these radial portions are in direct radial lines with the center of the hub, and this is one of the distinctive features of this invention, and by reason thereof, the wheel is perfectly balanced at all times and the strain and weight of the load distributed throughout all the spokes, any desired number of which may be employed, and a wheel made in this manner while possessing all the requisite strength will also possess the elastic qualities necessary in such wheel and particularly when such wheels are intended for use on vehicles desired for conveyances or for pleasure purposes.

Having fully described my invention, what I claim as new and desire to secure by Letters Patent, is:—

A wheel comprising a hub, a rim and spokes, the spokes being composed of flat springs consisting of central arc-shaped portions and radial end portions, the central portions of the spokes being all curved in the same direction, and the hub consisting of side plates between which the inner end portions of the spokes are passed, said inner end portions of the spokes being provided with radially elongated loops through the outer and inner end portions of which are passed bolts which are also passed through the side plates of the hub, and the outer end portions of said spokes being provided with foot members which are secured to the rim and which extend in a direction opposite to that of the curve of the central arc-shaped portion.

In testimony that I claim the foregoing as my invention I have signed my name in presence of the subscribing witnesses this 1st day of July 1914.

AUGUST GERLEIT.

Witnesses:
C. MULREANY,
H. E. THOMPSON.

Copies of this patent may be obtained for five cents each, by addressing the "Commissioner of Patents, Washington, D. C."